United States Patent [19]

Moir et al.

[11] Patent Number: 5,129,451

[45] Date of Patent: Jul. 14, 1992

[54] HEAT TRANSFER RING

[76] Inventors: Ian Moir; Karl Heina, both of 4303 Regency Dr., Glenview, Ill. 60025

[21] Appl. No.: 766,378

[22] Filed: Sep. 23, 1991

[51] Int. Cl.⁵ .............................................. A47J 37/04
[52] U.S. Cl. ..................................... 165/185; 99/419; 99/442
[58] Field of Search ................. 165/185; 99/419, 442

[56] References Cited

U.S. PATENT DOCUMENTS

| | | | |
|---|---|---|---|
| 2,052,505 | 8/1936 | Vetrosky | 99/419 |
| 2,411,345 | 11/1946 | Suttles | 419/99 X |
| 3,379,118 | 4/1968 | Perez | 99/419 |
| 4,217,817 | 8/1980 | Meamber | 99/349 |
| 4,272,669 | 6/1981 | Yamanaka et al. | 219/385 |
| 4,716,819 | 1/1988 | Beltz | 99/419 |
| 4,745,968 | 5/1988 | Demos | 165/185 |
| 4,887,523 | 12/1989 | Murphy et al. | 99/419 |
| 4,924,768 | 5/1990 | Jay | 99/425 |

Primary Examiner—Allen J. Flanigan

[57] ABSTRACT

A heat transfer ring that is readily usable in any application requiring heat transfer from a heat source to a medium coming in contact with the ring. The ring may also be used in a reverse application where it is used to cool the medium coming into contact with it. The ring is a cast body consisting of a plurality of integrally connected circular rings to which a series of tapered prongs are attached so as to provide a large heat sink. The prongs are of a tapered conical shape and are specifically positioned with respect to each other thereby spanning a larger dimension of the medium being treated so as to effectively and efficiently transfer heat thereto or therefrom.

6 Claims, 1 Drawing Sheet

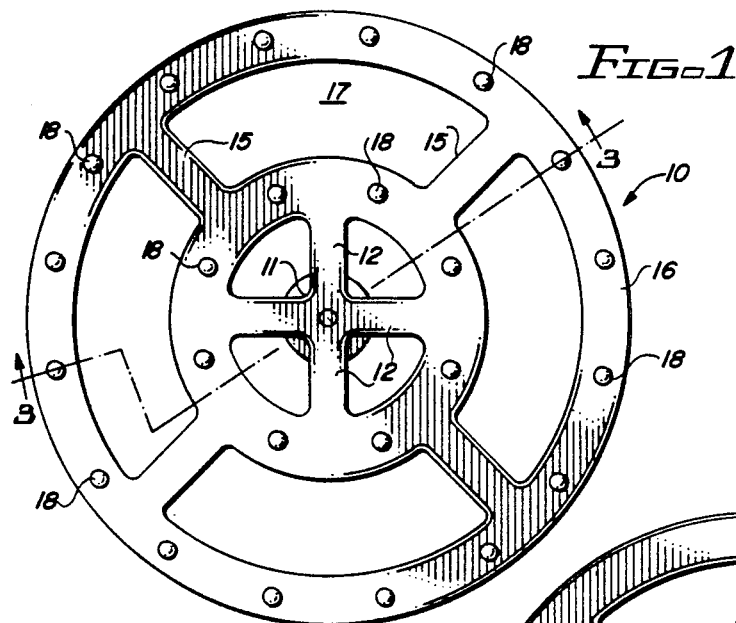
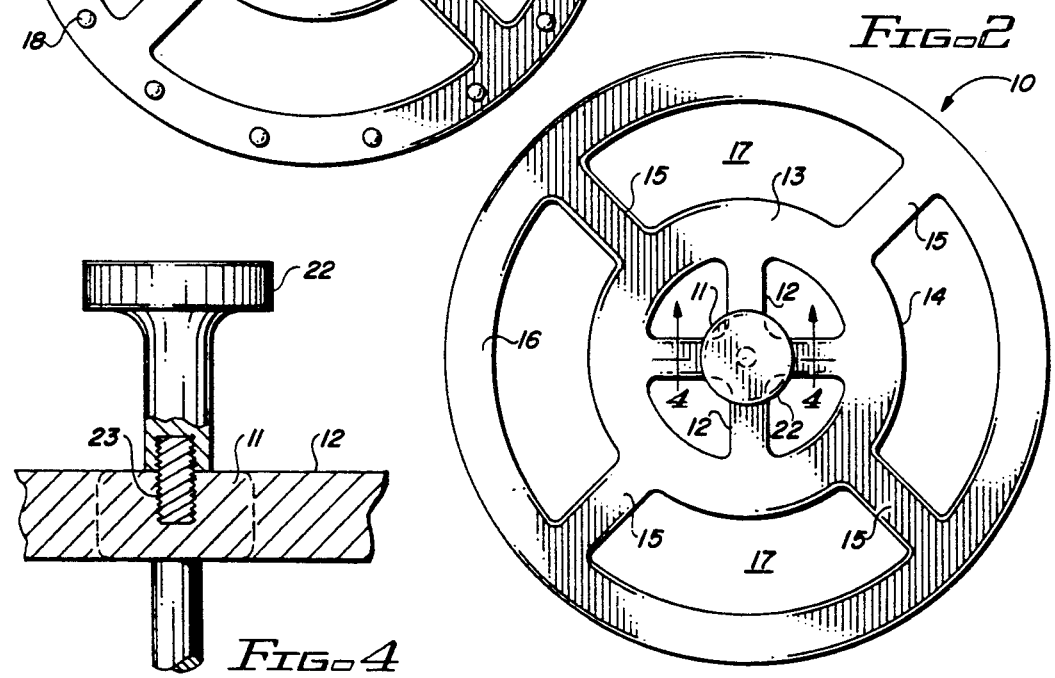
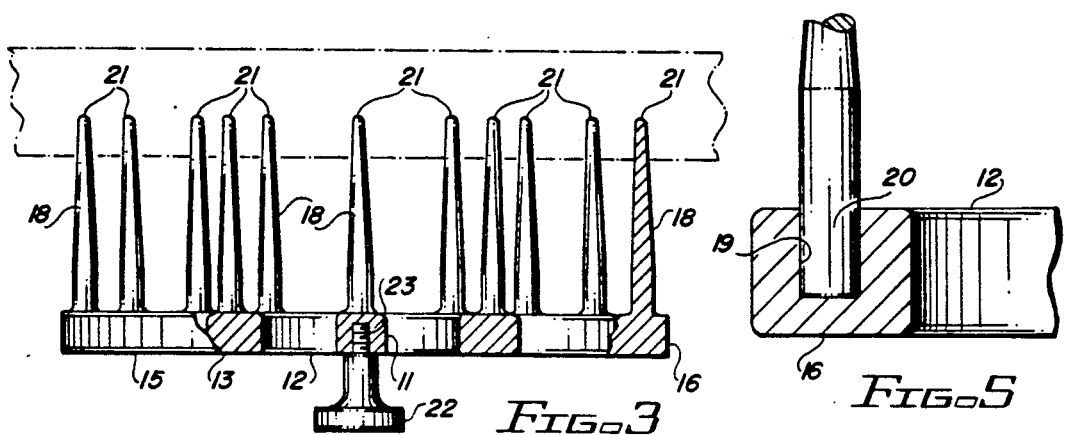

HEAT TRANSFER RING

FIELD OF INVENTION

The present invention relates to a heat transfer ring which is readily adaptable for transferring heat to a medium coming in contact with it or to cool a heated medium coming in contact with it.

BACKGROUND OF THE INVENTION

Prior devices have been known to transfer heat to the interior of a body by inserting into the body penetrating pins or spikes that conduct heat. The pins or spikes absorb heat from the exterior of the body and then transfers the heat to the interior thereof.

For example skewers and thermal pins for insertion into pieces of meat to be cooked are disclosed in U.S. Pat. No. 2,404,166. An apparatus for cooling potatoes and the like is disclosed in U.S. Pat. No. 3,379,118. U.S. Pat. No. 4,170,933 includes a heating plate that is positioned over and or upon the medium to be cooked and includes a plurality of spikes extending downwardly therefrom into the medium.

In many of the past known devices the plate or body thereof is required to be in direct contact with the heat source thereby utilizing a portion of the heat source which would otherwise be available to the medium being cooked. See U.S. pat. No. 4,745,968.

SUMMARY OF THE INVENTION

The heat transfer ring of this invention can be used in any application requiring heat transfer from a conductive, convection and/or radiant heat source to a medium placed in contact with the ring. The cast ring to which a series of tapered prongs are attached provides a large heat sink thereby allowing more heat to be readily transferred to the medium being cooked. The pins are of a tapered conical shape which are adaptable for impression upon and impregnation of the medium, thus offering low resistance when removed and with very little entrapped medium residue thereon.

The unique shape of the cast ring and the relationship of the prongs carried thereby provide enlarged uniform heat transfer channels producing a highly efficient transfer of heat.

The prongs may be integrally cast or press fitted into the ring thus permitting their removal and replacement if they become bent or otherwise damaged.

BRIEF DESCRIPTION OF THE DRAWINGS

The present invention may best be understood by reference to the accompanying drawings which illustrate the preferred embodiment of the invention by which the objects thereof are achieved and in which:

FIG. 1 is a bottom plan view of the heat transfer device of this invention.

FIG. 2 is a top plan view of this invention,

FIG. 3 is a side elevational detailed sectional view of the invention taken on line 3—3 of FIG. 1, FIG. 4 is a detailed sectional view of the handle connection for heat transfer device taken on line 4—4 of FIG. 2, and FIG. 5 is a fragmentary detailed sectional view showing an optional prong connection to the heat transfer ring of this invention.

DETAILED DESCRIPTION

Referring now to the drawings in which like reference characters designate like or corresponding parts throughout the several views, there is shown in FIG. 1 a bottom plan view of the heat transfer ring of this invention. As such the heat transfer ring 10 consists of a center hub 11 from which radially extend equally distant spokes 12. These spokes 12 in turn support a circular ring 13 circumferentially disposed upon the center hub 11.

Extending radially from the outer edge 14 of ring 13 are a series of spokes 15 which in turn supports a second circular ring 16 circumferentially around the ring 13 and hub 11.

It should be noted that the series of spokes 15 are equally spaced from each other and radially offset with respect to the spokes 12 thereby providing the non-congruous open areas or channels 17. By this construction a larger percentage of all exposed surfaces of the rings 13 and 16 are available for absorbing heat rom any source.

As more clearly shown in FIG. 1 the hub 11 contains a single transfer prong while each of the rings 13 and 16 support a plurality of parallelly disposed transfer prongs 18. As illustrated in FIGS. 3 and 5 these prongs 18 are adapted to be integrally cast of press fitted into preformed apertures 19 provided by ring 13 and 16, and from their inserted ends 20 are tapered throughout their length and terminate into impressionable tips 21. These prongs 18 are so constructed as to be identical in length as well as cross sectional diameters, so that there will be uniform heat transfer therefrom.

As illustrated in FIG. 1 the prongs 18 of each of the rings 13 and 16 are offset laterally with respect to the radial lines of the spokes 12 and 15. The prongs 18 of the ring 16 are also laterally offset with respect to a radial line drawn from the center of the hub 11 through the prongs 18 of the inner circular ring 13. As the prongs 18 are identical in dimensions and are so positionally related, the heat transfer therefrom, especially for their tips 21, will radiate outwardly and form an overlapping pattern on the medium being treated. Thus as illustrated in FIG. 5 a larger dimension of the medium is spanned, thereby providing a highly efficient and effective transfer of heat.

The radiating heat from the prongs 18 will form overlapping patterns encircling each tip 21, and the conductive heat transfer therefrom will be directly upon and into the medium being treated. The heat convectionally transferred from the sides of the prongs 18 will overlay the conductive heat patterns thus increasing the efficiency of the transfer process.

The benefits of effective and efficient transfer of heat results in reduced cooking time. As an example baking tests with pizzas resulted in baking times being reduced up to 40 percent over baking times in an oven without utilizing the heat transfer ring of this invention.

To aid in the function of reducing medium entrapment on the device, the ring 10 may be coated with high quality non-stick surface coating and is darkly colored to absorb radiant heat.

FIG. 4 discloses a handle 22 in a form of a knob which may be readily threaded into a suitable receptacle 23 formed in the upper surface of the hub 11.

While the detailed description specifically referred to the heat transfer apparatus as being a ring and circular in design it should readily understood that various configurations are embraced within the concept of this invention. While the description identifies two circular rings each illustrated as having a number of prongs, any number of rings or other shaped heat transfer forms may be incorporated as well as any number of prongs providing however that they be spaced and positioned relative to one another as set forth herein.

While I have illustrated and described the preferred form of construction for carrying my invention into effect, this is capable of variation and modification without departing from the spirit of the invention. I therefore, do not wish to be limited to the precise details of construction as set forth, but desire to avail myself of such variations and modifications as come within the scope of the appended claims.

Having thus described my invention what I claim as new and novel and desire to protect by letters patent is:

1. A heat transfer apparatus suitable for heating and/or cooling a medium comprising:
   a) a lightweight metallic body consisting of a center hub supporting a plurality of equidistant radially extending spokes,
   b) a concentric ring supported by said spokes so as to lie in the horizontal plane of said hub,
   c) a second concentric ring supported by said first concentric ring and lying in the horizontal plane of said hub,
   d) a second plurality of equidistant spokes radially extending from said concentric ring and laterally offset with respect to said plurality of radially extending spokes supporting said concentric ring for supporting said second concentric ring in the horizontal plane of said hub, and
   e) a set of parallel extending heat transferring prongs depending from each ring, with the set of prongs in each ring being equidistant from each other, with the number of prongs in each set being proportionate to the circumference of their supporting ring.

2. A heat transfer ring suitable for heating and/or cooling a medium as defined by claim 1 wherein said sets of prongs are press fitted into each ring so as to be replaceable.

3. A heat transfer apparatus suitable for heating and/or cooling a medium comprising:
   a) a lightweight metallic body consisting of a center hub supporting a plurality of equidistant radially extending spokes,
   b) a concentric ring supported by said spokes so as to lie in the horizontal plane of said hub,
   c) a second concentric ring supported by said first concentric ring and lying in the horizontal plane of said hub, and
   d) a set of parallel extending heat transferring prongs depending from each ring, with the set of prongs in each ring being equidistant and offset with respect to each other along lines radiating from said center hub, with the number of prongs in each set being proportionate to the circumference of their supporting ring.

4. A heat transfer ring suitable for heating and/or cooling a medium as defined by claim 3 including a second plurality of equidistant spokes radially extending from said concentric ring for supporting said second concentric ring in the horizontal plane of said hub.

5. A heat transfer ring suitable for heating and/or cooling a medium as defined by claim 4 wherein said second set of spokes supporting said second concentric ring are laterally offset with respect to said plurality of radially expending spokes supporting said circular ring.

6. A heat transfer ring suitable for heating and/or cooling a medium as defined by claim 3 wherein said sets of prongs are press fitted onto each ring so as to be replaceable.

* * * * *